(12) United States Patent
Shin et al.

(10) Patent No.: US 7,701,876 B2
(45) Date of Patent: Apr. 20, 2010

(54) MESSAGE TRANSMISSION METHOD AND DEVICE IN MIXTURE OF PRIVATE NETWORK AND PUBLIC NETWORK

(75) Inventors: Soon-churl Shin, Ansan-si (KR); Sang-moon Lee, Seoul (KR); Woo-lin Yang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 872 days.

(21) Appl. No.: 11/401,944

(22) Filed: Apr. 12, 2006

(65) Prior Publication Data

US 2006/0251078 A1 Nov. 9, 2006

(30) Foreign Application Priority Data

Apr. 12, 2005 (KR) .................. 10-2005-0030287

(51) Int. Cl.
*H04L 12/28* (2006.01)
*H04L 12/56* (2006.01)

(52) U.S. Cl. .................. 370/254; 370/392; 370/401; 709/238

(58) Field of Classification Search .................. None
See application file for complete search history.

(56) References Cited

U.S. PATENT DOCUMENTS 6,195,356 B1 * 2/2001 Anello et al. ............... 370/398
7,171,476 B2 * 1/2007 Maeda et al. ............... 709/227
7,403,485 B2 * 7/2008 Rosenberg ............... 370/238.1
7,447,796 B2 * 11/2008 Forrester ............... 709/238
2003/0021273 A1 * 1/2003 Fouquet et al. ............... 370/392
2006/0036763 A1 * 2/2006 Johnson et al. ............... 709/238

FOREIGN PATENT DOCUMENTS

JP 06-296177 10/1994

OTHER PUBLICATIONS

Korean Office Action for Application No. 10-2005-0030287; dated Jul. 26, 2006.

* cited by examiner

*Primary Examiner*—Hong Cho
*Assistant Examiner*—Robert C Scheibel
(74) *Attorney, Agent, or Firm*—Staas & Halsey LLP

(57) ABSTRACT

A message transmission method and device are provided. The message transmission method, which is carried out by a node in a mixed network comprised of a private network including at least one node and a public network, includes: checking whether an address of a destination node to receive a message is recorded in a communication node list of the node, when the address of the destination node is not the address of the node; transmitting the message to the destination node recorded, when it is determined that the address of the destination node is recorded in the communication node list; and transmitting the message and the address of the destination node to a node having an address closest to the address of the destination node among the addresses recorded in the communication node list, when the address of the destination node is not recorded in the communication node list.

16 Claims, 8 Drawing Sheets

MESSAGE TRANSMISSION METHOD AND DEVICE IN MIXTURE OF PRIVATE NETWORK AND PUBLIC NETWORK

CROSS-REFERENCE TO RELATED APPLICATIONS

This application claims the benefit of Korean Patent Application No. 10-2005-0030287, filed on Apr. 12, 2005, in the Korean Intellectual Property Office, the disclosure of which is incorporated herein in its entirety by reference.

BACKGROUND OF THE INVENTION

1. Field of the Invention

The present invention relates to a mixed network comprised of a private network and a public network, and more particularly, to a message transmission method and device in a mixed network comprised of a private network and a public network.

2. Description of the Related Art

Conventionally, client/server architecture has been used for communication in a mixed network comprised of private networks and public networks. The client/server architecture has been widely used with implementation of Internet Protocol (IP) and most communications are based on the Internet Protocol.

Generally, when a plurality of clusters using a private network is managed integrally, the following problems occur. Here, a cluster includes a bundle of intelligent devices (or nodes) for accomplishing particular purposes and a network device for interfacing interactive operations between the intelligent devices.

First, messages should be transmitted between a node for performing the integral management and nodes subjected to the integral management. However, there is a problem that a node having a private network address in a private network cannot transmit and receive a message with a node having a private network address in another private network.

Further, when the number of clusters to be integrally managed increases or when the number of nodes in the respective clusters increases, that is, when the number of nodes to be managed increases, the transmission of messages may be temporarily concentrated on a specific node in transmitting messages for the integral management. The concentration of message transmission on a node may cause deterioration in performance of an information collecting processor and may occasionally cause an obstacle in the information collecting processor.

FIG. 1 is a graph illustrating an information processing rate of a server, that is, a master node, with respect to the number of clients, where the X-axis indicates the number of clients and the Y-axis indicates the processing rate of the server. Here, a client means software to which information should be transmitted, and a plurality of clients may exist in each node.

Referring to FIG. 1, the processing rate per minute of the server increases with an increase in the number of clients (2), when the server is able to process more jobs. FIG. 1 shows that the maximum processing rate per minute of the server is approximately 8000 (4). However, when the number of nodes (i.e., the number of clients) reaches 1800, and messages are simultaneously transmitted to a specific node (i.e., a master node), the processing rate of the information collecting processor of the specific node can be hindered (6) as shown in FIG. 1. At this time, the number of simultaneous connections may vary depending upon circumstances of systems or networks, but the number of simultaneous connections cannot increase infinitely.

SUMMARY OF THE INVENTION

The present invention provides a message transmission method and device that can allow a node to freely transmit and receive a message with any other node in a mixed network comprised of a private network and a public network, whether the node belongs to the private network or the public network.

According to an aspect of the present invention, there is provided a message transmission method which is carried out by a first node in a mixed network comprised of a private network having at least one node and a public network, the message transmission method comprising: checking whether an address of a destination node intended to receive a message is recorded in a communication node list of the first node, when the address of the destination node is not the address of the first node; transmitting the message to the destination node for which the address is recorded in the communication node list, when it is determined that the address of the destination node is recorded in the communication node list; and transmitting the message and the address of the destination node to the one of an upper-level node or lower-level nodes having an address closest to the address of the destination node among the addresses recorded in the communication node list, when the address of the destination node is not recorded in the communication node list, wherein the first node has a communication function and a processing function.

According to another aspect of the present invention, there is provided a message transmission device which is provided in a first node so as to transmit a message between two nodes in a mixed network comprised of a private network having at least one node and a public network, the message transmission device comprising: a list check unit checking whether an address of a destination node to receive a message is recorded in a communication node list of the first node, when the address of the destination node is not the address of the first node; and a first message transmission unit transmitting the message to the destination node for which the address is recorded in the communication node list or transmitting the message and the address of the destination node to the one of an upper-level node or lower-level nodes having an address closest to the address of the destination node among the addresses recorded in the communication node list, in response to the check result of the list check unit, wherein the first node has a communication function and a processing function.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Hereinafter, the present invention will be described in detail by explaining embodiments of the invention with reference to the attached drawings.

Figure 1:
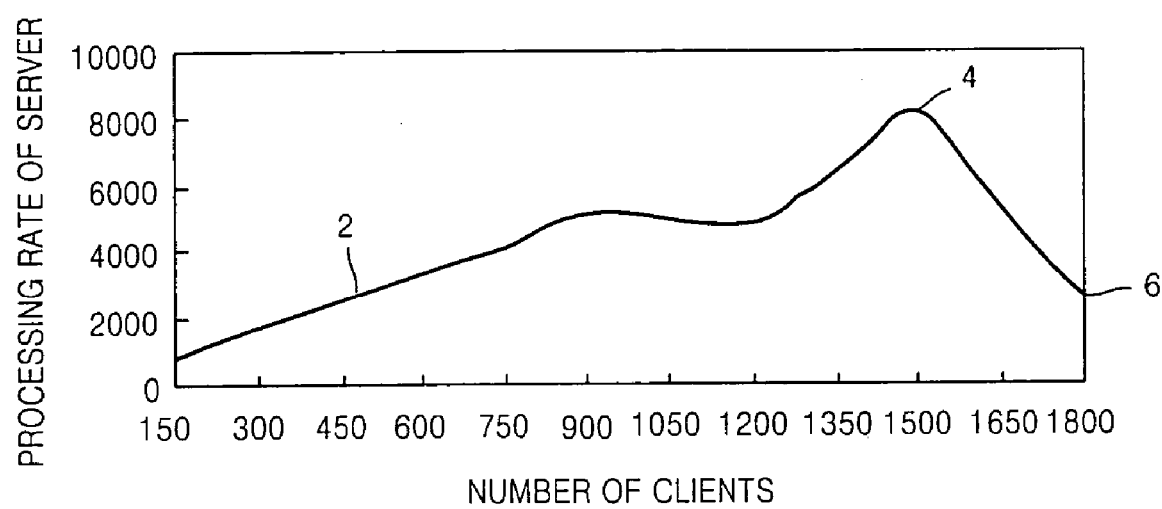
FIG. 1 is a graph exemplarily illustrating an information processing rate of a server with respect to the number of clients.
Figure 2:
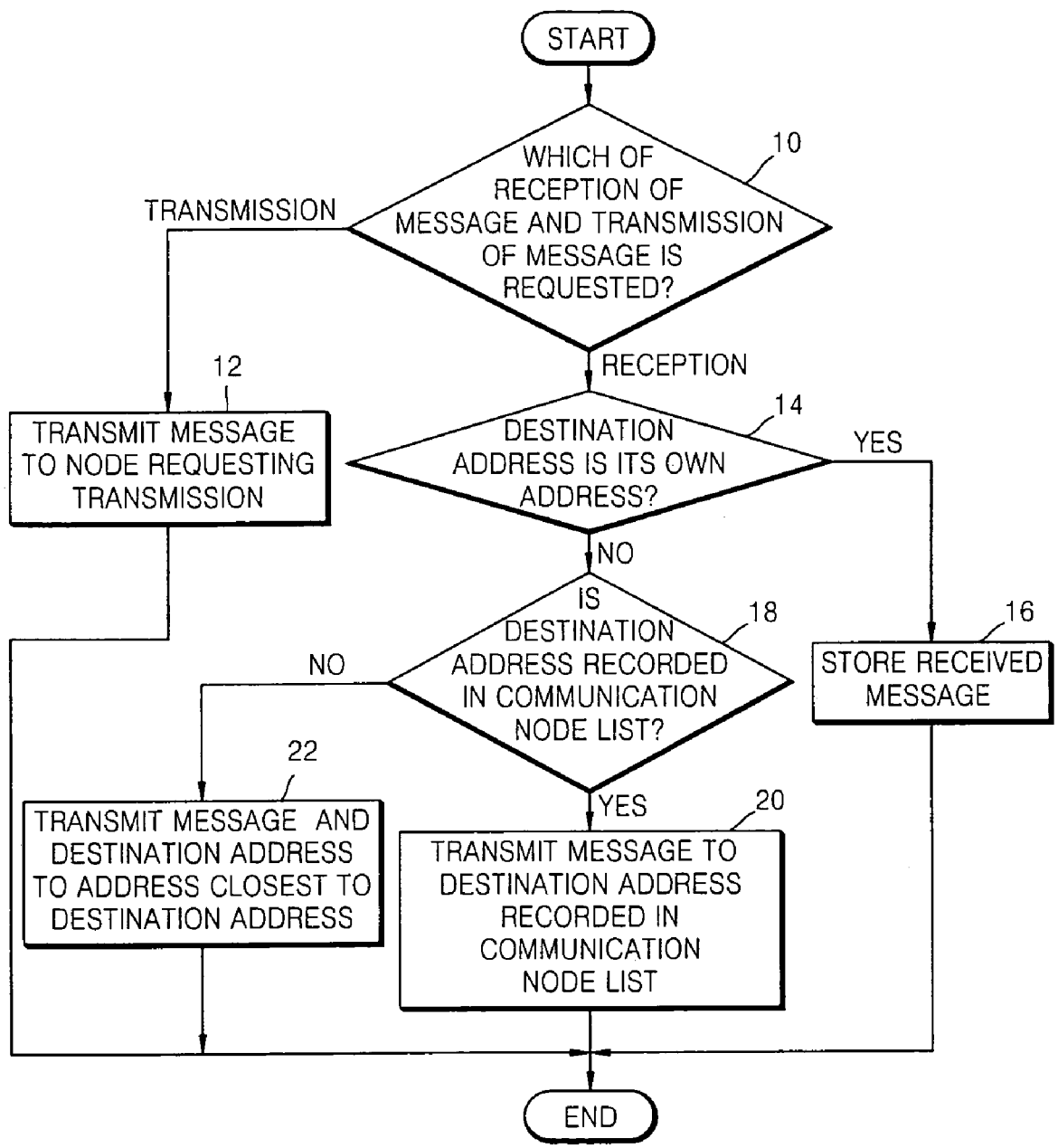
FIG. 2 is a flowchart illustrating a message transmission method according to an embodiment of the present invention.

FIG. 2 is a flowchart illustrating a message transmission method according to an embodiment of the present invention, wherein the method includes operations (operations 10 to 22) of storing or transmitting a message to a corresponding node when reception of the message is requested.

Figure 3:
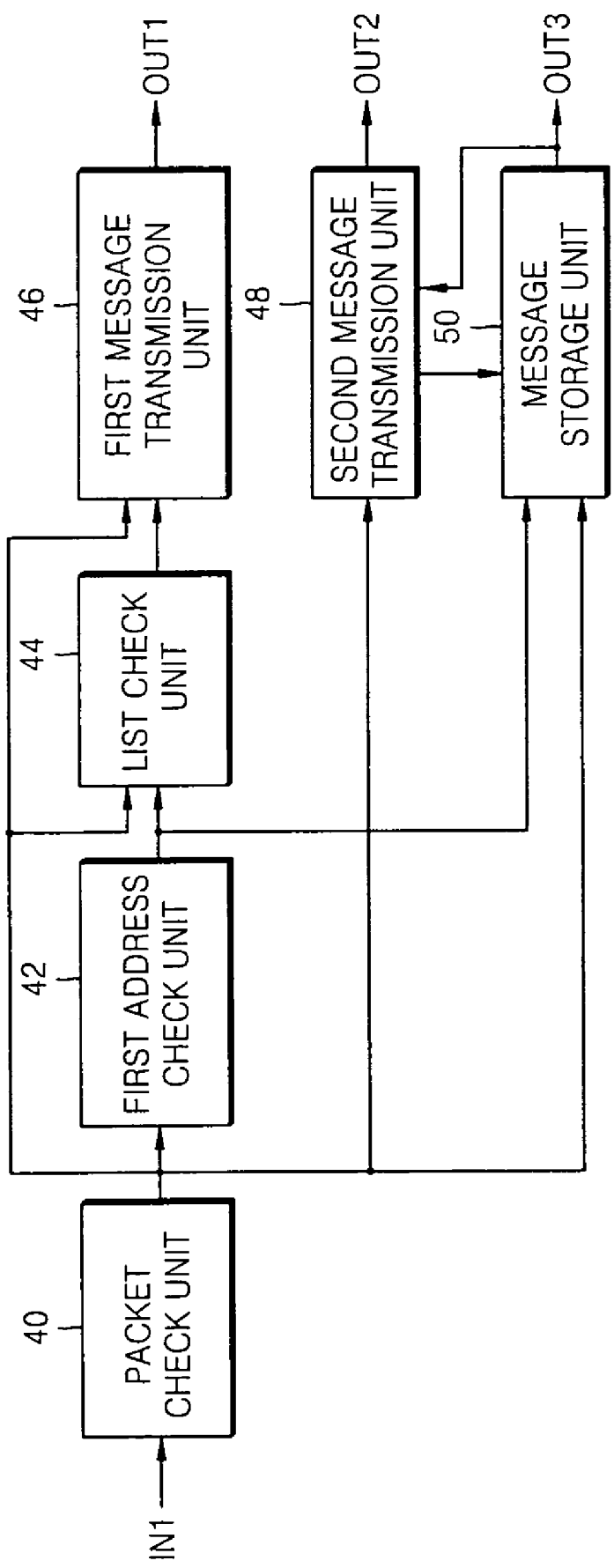
FIG. 3 is a block diagram illustrating a message transmission device according to an embodiment of the present invention.

FIG. 3 is a block diagram illustrating a message transmission device according to an embodiment of the present invention, where the device includes a packet check unit 40, a first address check unit 42, a list check unit 44, first and second message transmission units 46 and 48, and a message storage unit 50.

In order to transmit a message between two nodes (hereinafter, referred to as first and second nodes) in a mixed network comprised of private networks and public networks, the respective nodes perform the message transmission method shown in FIG. 2 using the message transmission device illustrated in FIG. 3. Here, a message may be a series of data or a file, may include management data for managing other nodes, or may include non-management data for simply delivering information rather than managing other nodes.

A private network, a public network, and a node will be described as follows.

Figure 4:
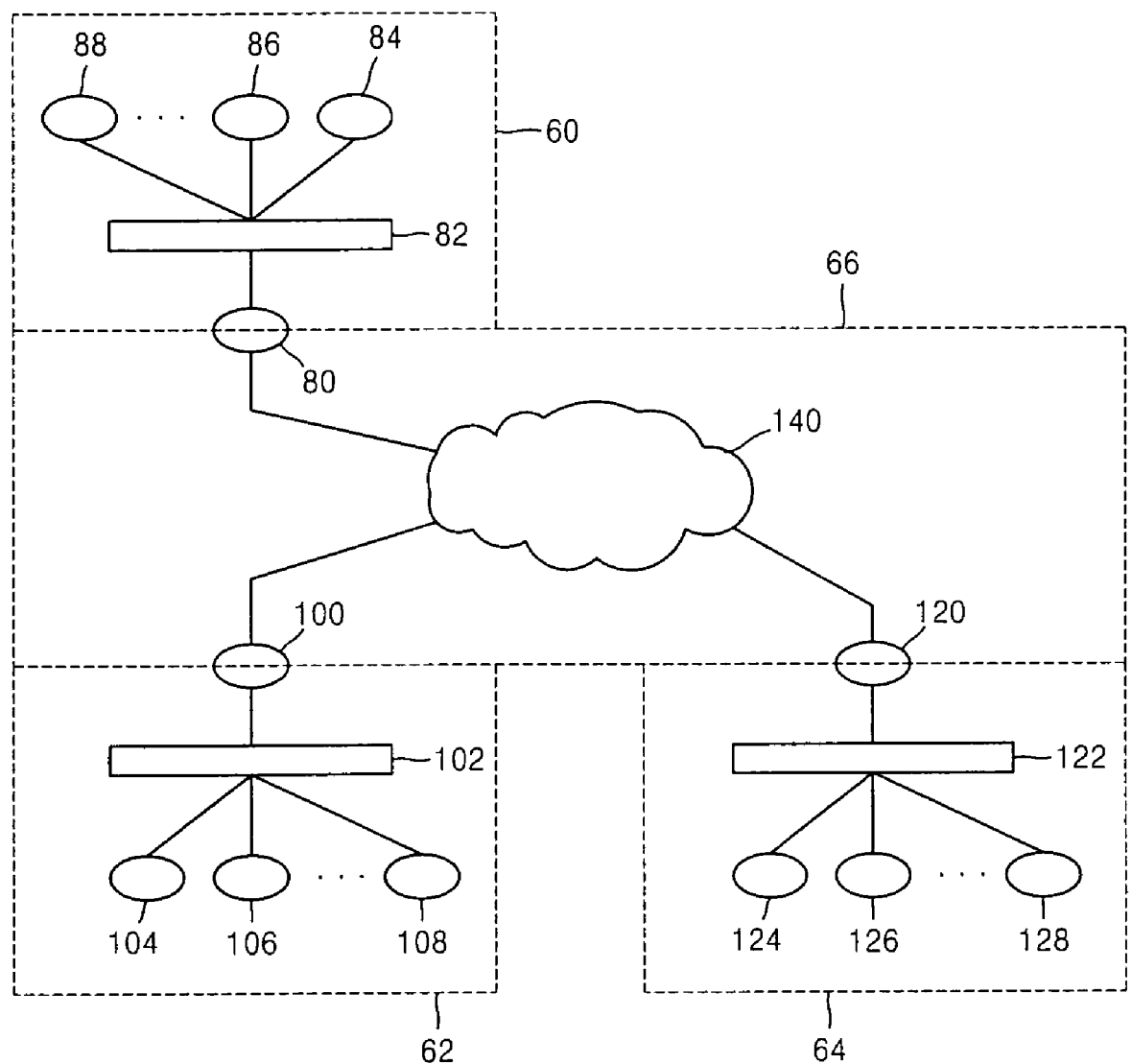
FIG. 4 is a diagram exemplarily illustrating a mixed network comprised of private networks and a public network.

FIG. 4 is a diagram exemplarily illustrating a mixed network comprised of a private network and a public network, where the mixed network includes private networks 60, 62, and 64 and a public network 66. For convenience of explanation, only three private networks 60, 62, and 64 are shown in FIG. 4, but a different number of private networks may be provided.

The respective private networks 60, 62, and 64 shown in FIG. 4 each have at least one node. For example, as shown in FIG. 4, the private network 60 includes a master node 80, a network device 82, and slave nodes 84, 86, . . . , and 88. Similarly, the private network 62 includes a master node 100, a network device 102, and slave nodes 104, 106, . . . , and 108. The private network 64 includes a master node 120, a network device 122, and slave nodes 124, 126, . . . , and 128. The public network 66 includes the master nodes 80, 100, and 120 and the Internet 140.

Here, the master node 80 has a public Internet address for accessing the Internet 140 and at least one private Internet address for communicating with the slave nodes 84, 86, . . . , 88 included in the private network 60. Similarly, the master node 100 has a public Internet address for accessing the Internet 140 and at least one private Internet address for communicating with the slave nodes 104, 106, . . . , 108 included in the private network 62. The master node 120 has a public Internet address for accessing the Internet 140 and at least one private Internet address for communicating with the slave nodes 124, 126, . . . , 128 included in the private network 64. Each of the slave nodes 84, 86, . . . , 88, 104, 106, . . . , 108, 124, 126, . . . , and 128 has at least one private Internet address. Here, the network device 82 serves to allow the master node 80 and the slave nodes 84, 86, . . . , 88 to communicate with each other. The network device 102 serves to allow the master node 100 and the slave nodes 104, 106, . . . , 108 to communicate with each other. The network device 122 serves to allow the master node 120 and the slave nodes 124, 126, . . . , 128 to communicate with each other. The master nodes 80, 100, and 120 included in the private networks 60, 62, and 64 serve to manage the slave nodes of the corresponding private networks 60, 62, and 64.

The respective nodes 80, 84, 86, . . . , 88, 100, 104, 106, . . . , 108, 120, 124, 126, . . . , and 128 each have a communication function and a processing function. That is, the respective nodes are intelligent devices having a processing function for performing their inherent jobs and a communication function capable of transmitting and receiving the processed result with other nodes (i.e., communicating with other nodes). For example, a node may be a sensor, a home appliance of a home network system, a personal computer, or communication devices for future systems.

Regardless of which private network two nodes belong to, message transmission between the two nodes can be performed using the message transmission method according to an embodiment of the present invention illustrated in FIG. 2. For this purpose, the respective nodes may include the message transmission device illustrated in FIG. 3, which performs the message transmission method illustrated in FIG. 2. According to an embodiment of the present invention, the two nodes may be included in different private networks, respectively, or may be included in the same private network. The message transmission device illustrated in FIG. 3 is provided in the respective nodes in the mixed network.

The message transmission method carried out by the message transmission device of any one node will be described. First, as is illustrated in FIG. 3, the packet check unit 40 receives a packet through an input terminal IN1 and checks the received packet to determine whether reception of the message is requested or transmission of the message is requested (operation 10). The packet input through the input terminal IN1 may be generated from the node or may be generated from another node.

When it is determined from the check result of the packet check unit 40 that reception of the message is requested, the first address check unit 42 checks whether an address of a destination node is the address of the node making the check (operation 14). For this purpose, the first address check unit 42 may receive the address of the destination node from the packet check unit 40.

When it is determined from the check result of the first address check unit 42 that the address of the destination node is the address of the node making the check, the message storage unit 50 stores the received message input from the packet check unit 40 (operation 16). At this time, the message stored in the message storage unit 50 may be output through an output terminal OUT3 or may be output to the second message transmission unit 48 as will be described later. Accordingly, the message storage unit 50 may be embodied as a kind of storage table.

However, when it is determined from the check result of the first address check unit 42 that the address of the destination node is not the address of the node making the check, the list check unit 44 checks whether the address of the destination node is recorded in a communication node list (operation 18). For this purpose, the list check unit 44 can receive the address of the destination node from the packet check unit 40. Here, the communication node list of the node is a list of a plurality of nodes among nodes which can communicate with that node. For example, the communication node list means a list of at least one other node connected directly to the node.

Figure 5:
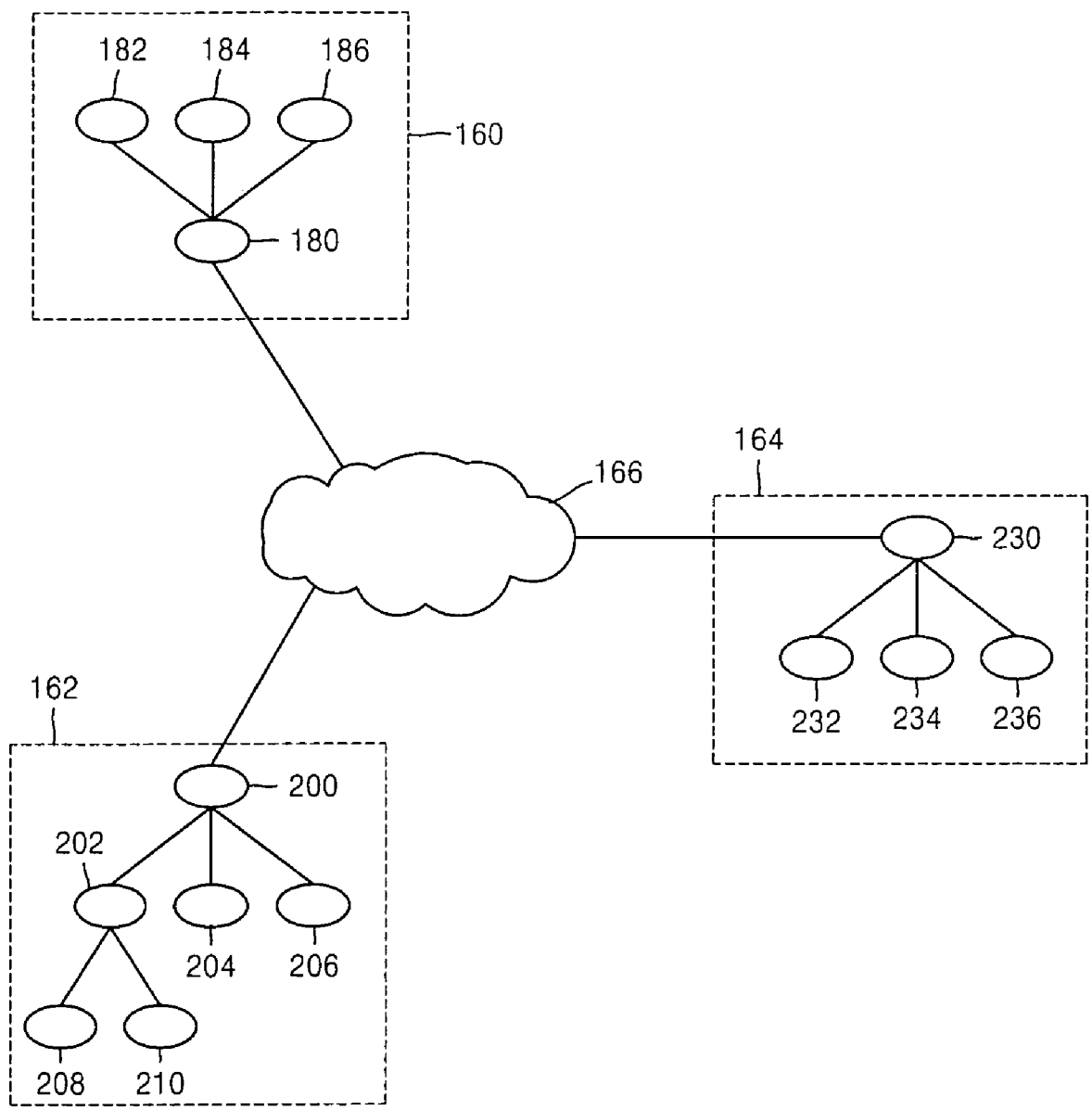
FIG. 5 is a diagram illustrating an example of a message transmission path formed using the message transmission method according to an embodiment of the present invention.

FIG. 5 is a diagram illustrating an example of a message transmission path formed using the message transmission method according to an embodiment of the present invention, where the message transmission path includes private networks 160, 162, and 164 and the Internet 166.

The private network 160 shown in FIG. 5 includes nodes 180, 182, 184, and 186, the private network 162 includes nodes 200, 202, 204, and 206, and the private network 164 includes nodes 230, 232, 234, and 236. Here, network devices are not shown for the purpose of convenience, but the network devices shown in FIG. 4 exist between the nodes.

The communication node list for a particular node contains addresses of nodes connected directly to that node without passing through any other node in the message transmission path. For example, referring to FIG. 5, when the particular node is "202", addresses of the nodes 200, 208, and 210 connected directly to the node 202 are recorded in a communication node list for that node 202. When the node is "230", addresses of the nodes (232, 234, and 236, the master node 180 of the private network 160, and the master node 200 of the private network 162) connected directly to node 230 are recorded in a communication node list for the node 230.

The first message transmission unit 46 transmits the message to the address of the destination node recorded in the communication node list or transmits the message and the address of the destination node to an address of a node closest to the address of the destination node among the addresses recorded in the communication node list, in response to the check result of the list check unit 44 (operations 20 and 22).

For example, when it is checked from the check result of the list check unit 44 that the address of the destination node is recorded in the communication node list, the first message transmission unit 46 transmits the message to the address of the destination node recorded in the communication node list through an output terminal OUT1 (operation 20). However, when it is checked from the check result of the list check unit 44 that the address of the destination node is not recorded in the communication node list, the first message transmission unit 46 transmits the message and the address of the destination node to an address of a node closest to the address of the destination node among the addresses recorded in the communication node list (operation 22). For this purpose, the first message transmission unit 46 can receive the message and the address of the destination node from the packet check unit 40.

The second message transmission unit 48 transmits the message stored in that node to the node having requested the transmission of the message through the output terminal OUT2 in response to the check result of the packet check unit 40 (operation 12). That is, when it is determined from the check result of the packet check unit 40 that the transmission of the message is requested, the second message transmission unit 48 transmits the message stored in that node to the node having requested the transmission of the message. Accordingly, when it is determined from the check result of the packet check unit 40 that the transmission of the message is requested, the second message transmission unit 48 can address the message storage unit 50, can read out the message from the message storage unit 50, and then can output the read-out message through the output terminal OUT2.

The addresses listed in the communication node list, the address of the destination node, and the address of the node itself may be embodied as actual Internet addresses or virtual addresses. Here, a virtual address means a non-authorized address, not an authorized address such as an Internet address. When the addresses are embodied as virtual addresses, the virtual addresses are allowed in advance to map on the actual Internet addresses. Accordingly, a node can confirm the Internet address corresponding to a virtual address from the mapping result and can communicate with other nodes by the use of the Internet addresses, not the virtual addresses. For this purpose, the node may particularly include a mapping table (not shown) allowing the virtual addresses to map on the Internet addresses.

Figure 6:
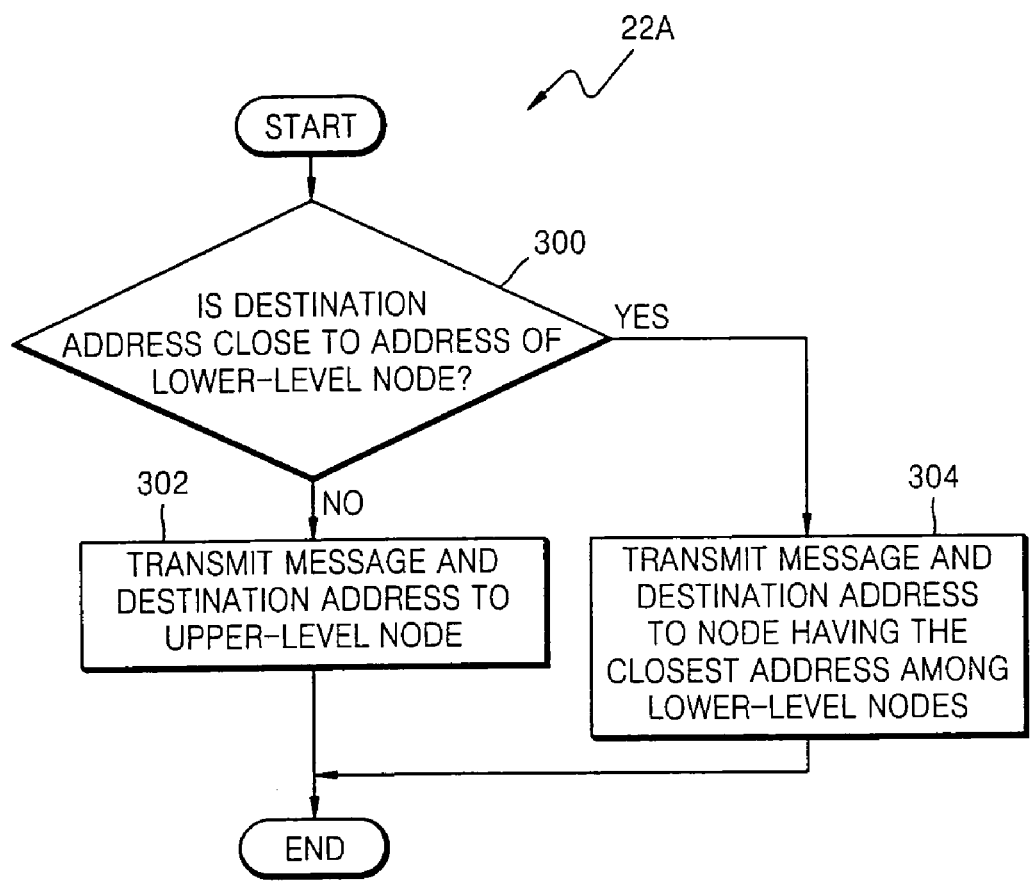
FIG. 6 is a flowchart illustrating an example of an operation 22 of the method illustrated in FIG. 2.

FIG. 6 is a flowchart illustrating an example 22A of operation 22 shown in FIG. 2, where operation 22A includes operations 300 through 304 in which the message and the address of the destination node are transmitted to an upper-level node or a lower-level node on the basis that the address of the destination node is closer to a lower-level node.

Figure 7:
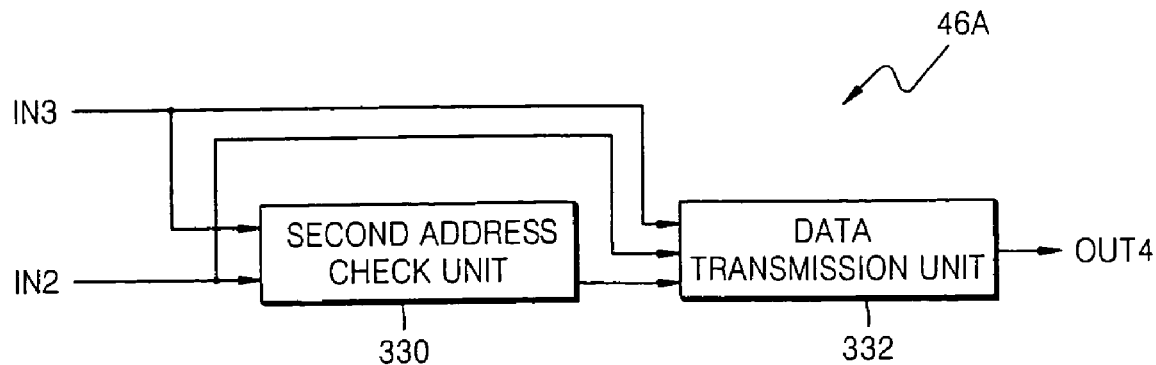
FIG. 7 is a block diagram illustrating an example of a first message transmission unit illustrated in FIG. 3 according to an embodiment of the present invention.

FIG. 7 is a block diagram illustrating an example 46A of the first message transmission unit 46 illustrated in FIG. 3 according to an embodiment of the present invention, where the first message transmission unit 46A includes a second address check unit 330 and a data transmission unit 332. The first message transmission unit 46A illustrated in FIG. 7 can perform operation 22A shown in FIG. 6.

When it is determined from the check result of the list check unit 44 that the address of the destination node is not recorded in the communication node list, the second address check unit 330 checks whether the address of the destination node is closer to an address of a lower-level node among the addresses recorded in the communication node list and outputs the check result to the data transmission unit 332 (operation 300). For this purpose, the second address check unit 330 can receive the communication node list containing addresses of lower-level nodes from the list check unit 44 through an input terminal IN3 and receive the address of the destination node from the packet check unit 40 through an input terminal IN2.

Here, a node is defined as a lower-level node if it is further away from a reference node in the message transmission path with respect to a first node, and a node is defined as an upper-level node if it is closer to the reference node. The reference node is a node to which a reference address is given among the nodes in any private network. The addresses of the nodes in any private network are set with respect to the reference address.

Figure 8:
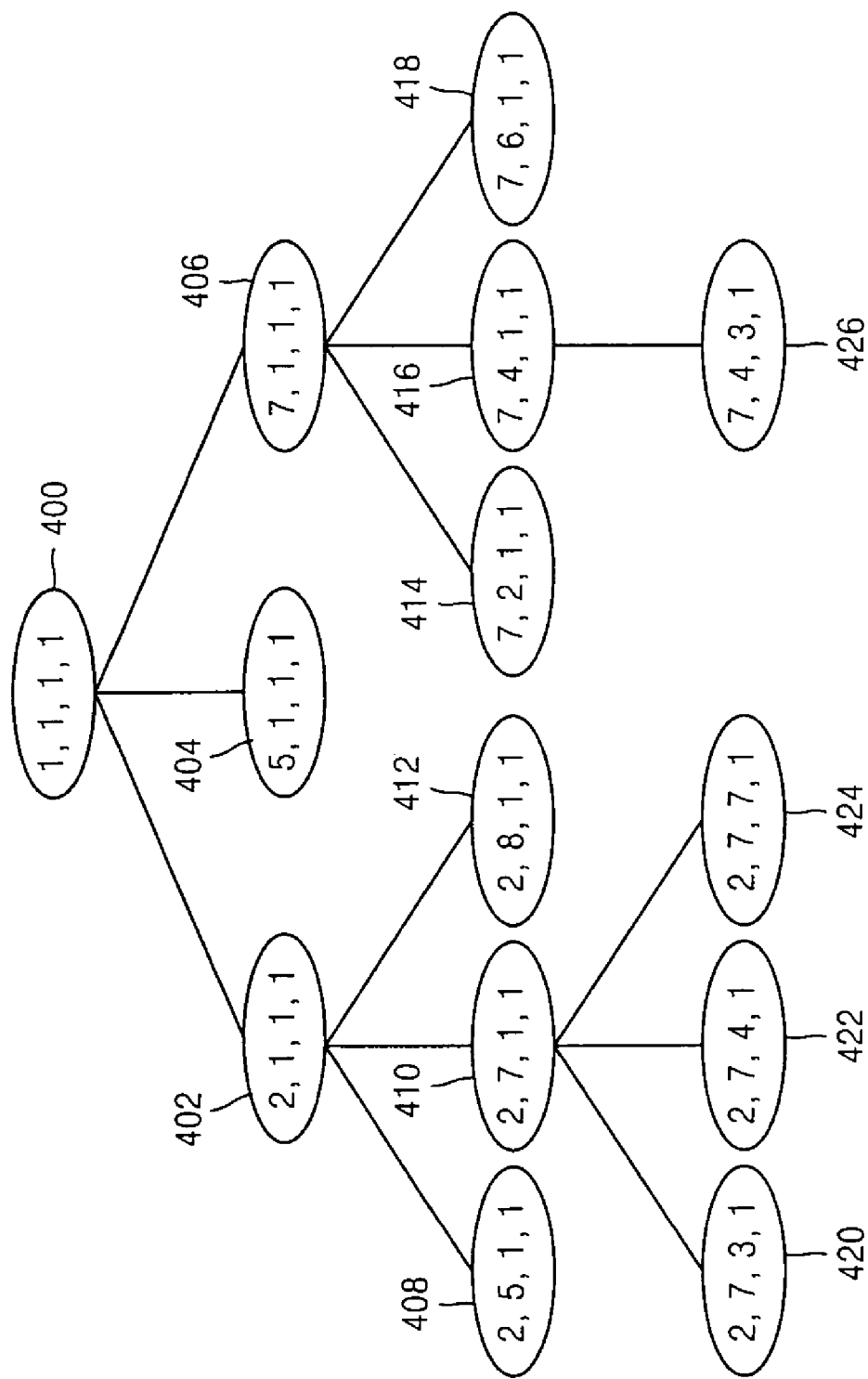
FIG. 8 is a diagram illustrating another example of the message transmission path for the purpose of explaining address setting in nodes according to an embodiment of the present invention.

FIG. 8 is a diagram illustrating another example of the message transmission path for the purpose of explaining the address setting of the respective nodes according to another embodiment of the present invention, where the message transmission path includes a plurality of nodes 400 through 426. In FIG. 8, it is assumed that the nodes have 4-bit addresses, but the present invention is not limited thereto.

Referring to FIG. 8 the reference address is "1,1,1,1" and the node 400 to which the reference address (1,1,1,1) is given is the reference node. A node is an upper-level node if it is closer to the reference node 400 with respect to the first node and is a lower-level node if it is further away from the reference node 400 with respect to the first node. For example, as seen from the view point of the node 410, the node 402 closer to the reference node 400 than the node 410 is an upper-level node and the nodes 420, 422, and 424 that are further away from the reference node 400 than node 410 are lower-level nodes.

In operation 300, in order to check to which address the address of the destination node is closer among the addresses of the nodes recorded in the communication node list, addresses may be given to the nodes as follows. Any one node of a plurality of nodes is set as a reference node and then a reference address; for example, "1,1,1,1" as shown in FIG. 8, is given to the set reference node. Generally, the node closer to the Internet in the message transmission path is set as the reference node.

At this time, the addresses of the nodes positioned at lower levels than the reference node in the message transmission path are generated by changing one bit of "1,1,1,1" as shown in FIG. 8, for example, the leftmost bit. Therefore, as shown in FIG. 8, the leftmost bit "1" of the address of the reference node 400 is changed to "2", "5", and "7", thereby generating the addresses (2,1,1,1), (5,1,1,1), and (7,1,1,1) of the nodes 402, 404, and 406, respectively.

Then the addresses of the nodes 408, 410, 412, 414, 416, and 418 positioned at lower levels than the nodes 402, 404, and 406 in the message transmission path are generated by changing any other bit of the addresses of the nodes 402, 404, and 406, for example, the second bit from the left. As shown in FIG. 8, the second bit "1" from the left of the address (2,1,1,1) of the node 402 is changed to "5", "7", and "8", thereby generating the addresses (2,5,1,1), (2,7,1,1), and (2,8, 1,1) of the nodes 408, 410, and 412. Similarly, the second bit "1" from the left of the address (7,1,1,1) of the node 406 is changed to "2", "4", and "6", thereby generating the addresses (7,2,1,1), (7,4,1,1), and (7,6,1,1) of the nodes 414, 416, and 418.

Next, the addresses of the nodes 420, 422, and 424 positioned at lower levels than the node 410 in the message transmission path are generated by changing any other bit of the address of the node 410, for example, the third bit from the left. For example, as shown in FIG. 8, the third bit "1" from the left of the address (2,7,1,1) of the node 410 is changed to "3", "4", and "7", thereby generating the addresses (2,7,3,1), (2,7,4,1), and (2,7,7,1) of the nodes 420, 422, and 424.

The data transmission unit 332 determines an address of an upper-level node as the address of the closest node to the reference node with respect to the first node or determines an address of a node closest to the address of the destination node among the addresses of the lower-level nodes, and transmits the message and the address of the destination node to the upper-level node or the lower-level node determined as the closest node (operations 302 and 304). For this purpose, the data transmission unit 332 receives the communication node list containing the address of the upper-level node and the addresses of the lower-level nodes from the list check unit 44 through the input terminal IN3 and receives the address of the destination node and the message from the packet check unit 40 through the input terminal IN2.

When it is determined from the check result of the second address check unit 330 that the address of the destination node is not close to the addresses of the lower-level nodes, the data transmission unit 332 determines the address of the upper-level node as the address of the closest node and transmits the message and the address of the destination node to the determined upper-level node through the output terminal OUT4 (operation 302). However, when it is determined from the check result of the second address check unit 330 that the address of the destination node is close to the addresses of the lower-level nodes, the data transmission unit 332 determines the address of one of the lower-level nodes that is closest to the address of the destination node and transmits the message and the address of the destination node to the determined lower-level node through the output terminal OUT4 (operation 304).

In order to easily understand the message transmission method and device according to the present invention, it is supposed that the node 410 is the first node, the node 426 is a second node, and the address of the destination node is the address (7,4,3,1) of the node 426.

In operation 300, since the address of the destination node (7,4,3,1) is not recorded in the communication node list of the first node 410, the second address check unit 330 of the first node 410 checks whether the address of the destination node (7,4,3,1) is close to the addresses of the lower-level nodes (2,7,3,1), (2,7,4,1), and (2,7,7,1) among the addresses (2,1,1, 1), (2,7,3,1), (2,7,4,1) and (2,7,7,1) of the nodes 402, 420, 422, and 424 recorded in the communication node list, and outputs the check result to the data transmission unit 332 (operation 300). At this time, the leftmost bits of two addresses are compared. Since the leftmost bit "7" of the address of the destination node is not equal to any of the leftmost bits of the addresses (2,7,3,1), (2,7,4,1), and (2,7,7,1) of the lower-level nodes, the data transmission unit 332 transmits the message and the address (7,4,3,1) of the destination node to the upper-level node 402 with respect to the first node 410 (operation 302).

The second address check unit 330 of the message transmission device included in the node 402 then checks whether the address (7,4,3,1) of the destination node is close to the addresses (2,5,1,1) (2,7,1,1), and (2,8,1,1) of the lower-level nodes 408, 410, and 412 among the addresses (1,1,1,1), (2,5, 1,1), (2,7,1,1), and (2,8,1,1) of the nodes 400, 408, 410, and 412 recorded in the communication node list for the node 402. Here, the leftmost bits of two addresses are compared. Since the leftmost bit "7" of the address of the destination node is not equal to any leftmost bit of the addresses (2,5,1,1), (2,7, 1,1), and (2,8,1,1) of the lower-level nodes, the data transmission unit 332 transmits the message and the address (7,4,3,1) of the destination node to the upper-level node 400 having a level higher than that of the node 402 (operation 302).

Thereafter, the second address check unit 330 of the message transmission device included in the node 400 checks whether the address (7,4,3,1) of the destination node is close to the addresses (2,1,1,1) (5,1,1,1), and (7,1,1,1) of the lower-level nodes 402, 404, and 406 among the addresses (2,1,1,1), (5,1,1,1), and (7,1,1,1) of the nodes 402, 404, and 406 recorded in the communication node list for the node 400. Here, the leftmost bits of two addresses are compared. That is, since the leftmost bit "7" of the address of the destination node is equal to the leftmost bit "7" of the address (7,1,1,1) of the lower-level node 406, the data transmission unit 332 transmits the message and the address of the destination node to the lower-level node 406 having an address closest to the address of the destination node among the lower-level nodes 402, 404, and 406 having a level lower than that of the node 400 (operation 304).

At this time, the second address check unit 330 of the message transmission device included in the node 406 checks whether the address (7,4,3,1) of the destination node is close to the addresses (7,2,1,1), (7,4,1,1), and (7,6,1,1) of the lower-level nodes 414, 416, and 418 among the addresses (1,1,1,1), (7,2,1,1), (7,4,1,1), and (7,6,1,1) of the nodes 400, 414, 416, and 418 recorded in the communication node list for the node 406. Here, the second bits from the left of two addresses are compared. Since the second bit "4" from the left of the address of the destination node is equal to the second bit from the left of the address (7,4,1,1) of the lower-level node 416, the data transmission unit 332 transmits the message and the address of the destination node to the lower-level node 416 having an address closest to the address of the destination node among the lower-level nodes 414, 416, and 418 having a level lower than that of the node 406 (operation 302).

At this time, the second address check unit 330 of the message transmission device included in the node 416 checks whether the address (7,4,3,1) of the destination node is close to the address (7,4,3,1) of the lower-level node 426 among the addresses (7,1,1,1) and (7,4,3,1) of the nodes 406 and 426 recorded in the communication node list. Here, third bits from the left of two addresses are compared. Since the third bit "3" from the left of the address of the destination node is equal to the third bit from the left of the address (7,4,3,1) of the lower-level node 426, the data transmission unit 332 transmits the message and the address of the destination node to the lower-level node 426 having a level lower than that of the node 416 (operation 302).

The first address check unit 42 of the message transmission device included in the node 426 then checks whether the address (7,4,3,1) of the destination node is equal to the address (7,4,3,1) of the node 426 (operation 14). Since it is determined from the check result of the first address check unit 42 that the address of the destination node is the address of the node 426, the message storage unit 50 stores the message received from the packet check unit 40, that is, the message transmitted from the node 410 (operation 16).

Figure 9:
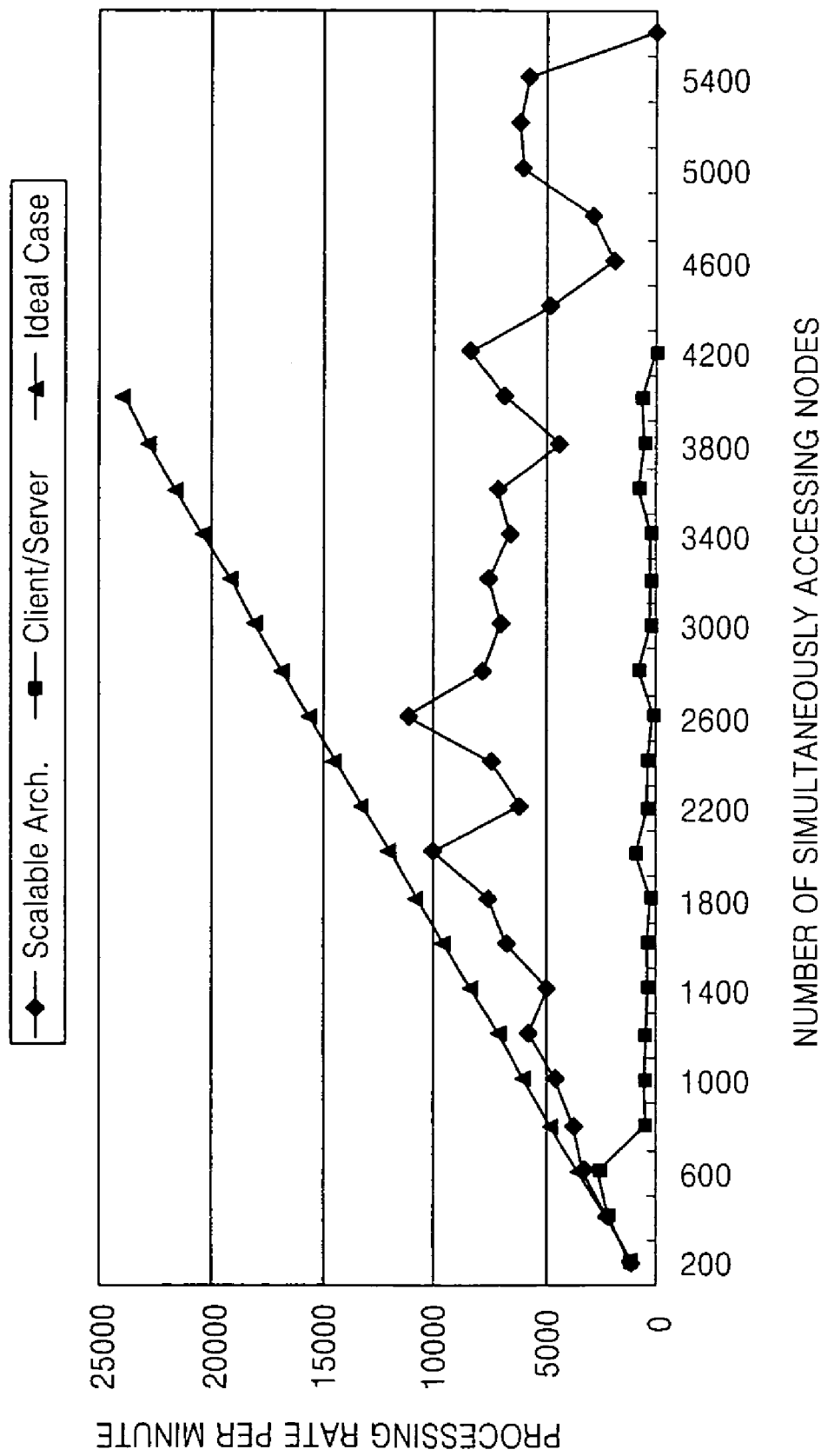
FIG. 9 is a graph illustrating a processing rate per minute in a server.

FIG. 9 is a graph illustrating a processing rate per minute of a server (i.e., a master node) where ▲ denotes an ideal case, ■ denotes a conventional client/server architecture, and ♦ denotes the present invention. Here, the X-axis indicates a processing rate per minute of the server and the Y-axis indicates the number of clients simultaneously connected.

In the conventional client/server architecture, a master node and a slave node communicate with each other by directly using a network device without interruption of any other node. Referring to FIG. 9, comparing the present invention with the conventional client/server architecture, it can be seen that the simultaneous connection ability of the present invention is improved by 33% from 4200 to 5600 and the message processing rate per unit of the server is improved by 791% from 715 per minute to 5661 per units.

The embodiments of the present invention can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), and storage media such as carrier waves (e.g., transmission through the Internet).

As described above, the message transmission method and device in a mixed network comprised of private networks and public networks according to the present invention can allow a message to be smoothly transmitted between nodes in the same network or in different networks. Accordingly, one node can manage other nodes by transmitting a management message to the nodes. In addition, the transmission of a message between nodes not connected directly to each other can be performed through relay of other nodes and thus the number of simultaneous accesses to a node is limited to the number of addresses recorded in the communication node list of that node. As a result, it is possible to prevent the number of simultaneous accesses to a specific node from increasing infinitely, by properly constructing the communication node list. That is, it is possible to prevent obstacles from occurring in nodes and network devices due to the concentration of communications to a specific node. Therefore, it is possible to more stably manage a large-scaled network in which private networks and public networks are mixed. When addresses are assigned to nodes, the addresses may be discontinuously assigned to the nodes. That is, when the addresses of the nodes 408, 410, and 412 are assigned by changing the second bit "1" from the leftmost bit of the address (2,1,1,1) of the node 402, a series of continuous numbers such as "2", "3", and "4" may be assigned and a series of discontinuous numbers such as "5", "7", and "8" may be assigned as shown in FIG. 8. In addition, even in communications between private networks that are protected by firewalls, it is possible to allow all the nodes to easily communicate with each other, by changing the firewall settings so as to allow only the nodes taking charge of the relay before and after the firewalls to communicate with each other.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A message transmission method carried out by a first node in a mixed network comprised of a private network having at least one node and a public network, the message transmission method comprising:

checking whether an address of a destination node to receive a message is recorded in a communication node list of the first node, when the address of the destination node is not the address of the first node;

transmitting the message to the destination node of which the address is recorded in the communication node list, when it is determined that the address of the destination node is recorded in the communication node list; and transmitting the message and the address of the destination node to one of an upper-level node and lower-level nodes with respect to the first node having an address determined to be closest to the address of the destination node among the addresses recorded in the communication node list, when the address of the destination node is not recorded in the communication node list;

wherein the first node has a communication function and a processing function, and wherein a reference address is given to a node in the network serving as a reference node in relation to the first node, and the addresses of nodes other than the reference node are generated based on the position of the other nodes in the network with respect to the reference node.

2. The message transmission method of claim 1, further comprising:

determining, on the basis of a given packet, whether reception or transmission of the message is requested;

transmitting the message to a node requesting the transmission of the message, when it is determined that the transmission of the message is requested;

determining whether the address of the destination node is the address of the first node when it is determined that the reception of the message is requested and determining whether the address of the destination node is recorded in the communication node list when the address of the destination node does not match the address of the first node; and storing the received message when it is determined that the address of the destination node matches the address of the first node.

3. The message transmission method of claim 2, wherein the packet is generated from the first node.

4. The message transmission method of claim 2, wherein the packet is generated from another node.

5. The message transmission method of claim 1, wherein the transmitting the message to one of the upper-level node or lower-level nodes having an address closest to the address of the destination node comprises:

determining whether the address of the destination node is closer to an address of one of the lower-level nodes among the addresses recorded in the communication node list, when it is determined that the address of the destination node is not recorded in the communication node list;

determining that an address of the upper-level node is the closest address and transmitting the message and the address of the destination node to the upper-level node, when it is determined that the address of the destination node is not closer to the address of one of the lower-level nodes; and determining that the address of one of the lower-level nodes closer to the address of the destination node is the closest address and transmitting the message and the address of the destination node to the lower-level node having the closest address, when it is determined that the address of the destination node is closer to the address of the lower-level node, and wherein in a message transmission path, the reference node is a node to which a reference address is given among nodes in a private network, the upper-level node indicates a node closer to the reference node, and the lower-level nodes indicate nodes apart from the reference node.

6. The message transmission method of claim 1, wherein the communication node list comprises addresses of one or more nodes connected directly to the first node in a message transmission path.

7. The message transmission method of claim 1, wherein two nodes between which the message is transmitted are included in different private networks, respectively.

8. The message transmission method of claim 1, wherein two nodes between which the message is transmitted are included in the same private network.

9. The message transmission method of claim 1, wherein the node is one of a sensor, a home appliance, and a personal computer.

10. The message transmission method of claim 1, wherein the addresses recorded in the communication node list, the address of the destination node, and the address of the node are virtual addresses and are matched in advance with actual Internet addresses.

11. A message transmission device which is provided in a first node so as to transmit a message between two nodes in a mixed network comprised of a private network having at least one node and a public network, the message transmission device comprising:

a list check unit checking whether an address of a destination node to receive a message is recorded in a communication node list of the first node, when the address of the destination node is not the address of the first node; and a first message transmission unit transmitting the message to the destination node of which the address is recorded in the communication node list or transmitting the message and the address of the destination node to one of an upper-level and lower-level nodes with respect to the first node determined to have an address closest to the address of the destination node among the addresses recorded in the communication node list, in response to the check result of the list check unit;

wherein the first node has a communication function and a processing function, and wherein a reference address is given to a node in the network serving as a reference node in relation to the first node, and the addresses of nodes other than the reference node are generated based on the position of the other nodes in the network with respect to the reference node.

12. The message transmission device of claim 11, further comprising:

a packet check unit receiving a packet and checking whether reception of the message is requested or transmission of the message is requested from the received packet;

a second message transmission unit transmitting the message stored in the first node to a node which has requested the transmission of the message in response to the check result of the packet check unit;

a first address check unit checking whether the address of the destination node is the address of the first node in response to the check result of the packet check unit; and a message storage unit storing the received message in response to the check result of the first address check unit;

wherein the list check unit checks whether the address of the destination node is recorded in the communication node list in response to the check result of the first address check unit.

13. The message transmission device of claim 11, wherein the first message transmission unit comprises:

a second address check unit checking whether the address of the destination node is closer to an address of one of the lower-level nodes among the addresses recorded in the communication node list in response to the check result of the list check unit; and a data transmission unit determining an address of the upper-level node as the address of the closest node and transmitting the message and the address of the destination node to the upper-level node, or determining an address of one of the lower-level nodes closer to the address of the destination node as the closest address and transmitting the message and the address of the destination address to the lower-level node having the closest address;

wherein in a message transmission path, the reference node is a node to which a reference address is given among nodes in a private network, the upper-level node indicates a node closer to the reference node and the lower-level node indicates a node apart from the reference node.

14. A message transmission method carried out by a first node in a mixed network, comprising:

determining whether an address of a destination node to receive a message is recorded in a communication node list for the first node; and transmitting the message to one of an upper-level node and lower-level nodes with respect to the first node determined to have an address closest to the address of the destination node if the destination node is not recorded in the communication node list, the upper-level node being a node closer to a reference node with respect to the first node and the lower-level nodes being nodes further from the reference node with respect to the first node,
wherein a reference address is given to the reference node, and the addresses of nodes other than the reference node are generated based on the position of the other nodes in the network with respect to the reference node.

15. The message transmission method according to claim 14, further comprising:
transmitting the message to the destination node directly if the address of the destination node is recorded in the communication node list.

16. The message transmission method according to claim 14, further comprising:
determining, prior to the step of determining whether an address of a destination node to receive a message is recorded in a communication node list for the first node, whether the address of the destination node is an address of the first node; and
storing the message if the address of the destination node is the address of the first node.

\* \* \* \* \*

UNITED STATES PATENT AND TRADEMARK OFFICE
CERTIFICATE OF CORRECTION

PATENT NO. : 7,701,876 B2 Page 1 of 1
APPLICATION NO. : 11/401944
DATED : April 20, 2010
INVENTOR(S) : Soon-churl Shin et al.

It is certified that error appears in the above-identified patent and that said Letters Patent is hereby corrected as shown below:

On the title page item (75),
Line 2, Change "Woo-lin" to --Woo-Jin--.

Signed and Sealed this

Seventeenth Day of August, 2010

David J. Kappos
*Director of the United States Patent and Trademark Office*